United States Patent [19]

Nissels

[11] Patent Number: 4,802,382

[45] Date of Patent: Feb. 7, 1989

[54] CONNECTING ROD ASSEMBLIES INTENDED FOR THE RECIPROCATING DRIVING OF A PISTON INSIDE A CYLINDER

[75] Inventor: Robert Nissels, Vallières, France

[73] Assignee: Société Berthoud S.A., Belleville sur Saone, France

[21] Appl. No.: 64,132

[22] Filed: Jun. 19, 1987

[30] Foreign Application Priority Data

Jun. 26, 1986 [FR] France ................................ 86 09483

[51] Int. Cl.⁴ ............................ G05G 1/00; F16J 1/04
[52] U.S. Cl. ............................ 74/579 R; 74/579 E;
74/581; 32/212; 32/214; 32/179; 123/197 AB
[58] Field of Search ................. 74/579 R, 579 E, 581;
123/197 AB, 197 AC, 41.36, 41.37; 29/156.5
A; 92/212, 214, 222, 248, 187

[56] References Cited

U.S. PATENT DOCUMENTS

| 984,250 | 2/1911 | Wiesner | 92/214 |
|---|---|---|---|
| 1,470,120 | 10/1923 | Schaefer | 74/579 |
| 1,625,805 | 4/1927 | Hansson | 74/579 |
| 2,096,067 | 10/1937 | Schaefer | 74/579 |
| 2,126,408 | 8/1938 | Peo | 74/579 |
| 2,328,439 | 8/1943 | Pelterie | 92/212 |
| 2,926,975 | 3/1960 | Karde et al. | 92/222 |
| 3,040,840 | 6/1962 | Cale | 74/579 |
| 3,095,221 | 6/1963 | Kaup | 92/179 |
| 3,473,444 | 10/1969 | Leffers | 92/214 |
| 3,693,463 | 9/1972 | Garman | 123/197 AB |
| 3,791,234 | 2/1974 | Kastan et al. | 74/579 R |
| 3,903,752 | 9/1975 | Riffe | 74/579 E |
| 4,142,500 | 3/1979 | Davis | 92/179 |
| 4,203,406 | 5/1980 | Smith | 123/197 AB |
| 4,301,776 | 11/1981 | Flemming | 123/197 AC |
| 4,463,710 | 8/1984 | McWhorter | 123/197 AB |

FOREIGN PATENT DOCUMENTS

| 1207362 | 2/1960 | France | 123/197 AC |
|---|---|---|---|
| 175666 | 6/1961 | Sweden | 123/197 AC |
| 1145140 | 3/1969 | United Kingdom | 92/179 |
| 1330902 | 9/1973 | United Kingdom | 74/579 E |

Primary Examiner—Richard E. Moore
Assistant Examiner—Vinh Luong
Attorney, Agent, or Firm—Dowell & Dowell

[57] ABSTRACT

A connecting rod for reciprocally driving a piston within a cylinder wherein the piston rod includes upper and lower portions which are connected by an area of thinner dimension which is also yieldable so as to permit the lower end of the connecting rod to assume varying angular orientations with respect to the upper end thereof and wherein the lower end of the rod includes a bearing surface which is cooperatively received so as to be driven by the end of an operating lever by way of which motion is imparted to the connecting rod.

8 Claims, 2 Drawing Sheets

CONNECTING ROD ASSEMBLIES INTENDED FOR THE RECIPROCATING DRIVING OF A PISTON INSIDE A CYLINDER

BACKGROUND OF THE INVENTION

1. Field of the Invention

This invention relates to improvements made to connecting rod assemblies particularly but not exclusively intended for driving the piston inside the cylinder of suction and dispensing pumps used for instance in atomizers.

2. History of the Related Art

Traditional drive connections are made of rods of which the small ends are articulated on the piston, and the big ends on a crankshaft or on a swinging lever.

It can be easily understood that these assemblies are rather expensive due to the machining operations necessary to manufacture the components thereof. Such connecting rod assemblies present two main inconveniences when used in devices similar to those mentioned above. First of all, the traditional articulations are too expensive with respect to the cost of manufacture. Secondly, they are exposed to corrosion attacks by phytosanitary agents, which are generally very active and destroy the lubrication greases.

SUMMARY OF THE INVENTION

The improvements that form the object of this invention tend to create the possibility of manufacturing a low cost connecting rod assembly that would not be subject to corrosion.

For that purpose, the rod of the connecting assembly according to the invention presents close to its small end a thinner section that forms a kind of articulation enabling such small end of the rod to change its orientation with respect to the associated piston according to the position of the piston along its path travel. The big end of the rod according to the invention has a round shape and bears against the concave extension of an actuating lever controlling the displacement of the piston during its driving stroke. Bosses ensure the necessary co-operation of the connecting rod with the lever during the return travel of the piston.

According to a preferred form of the foregoing arrangement, the bosses engage in the openings of the lever by elastic reduction of the rod thickness. The arrangement is such that the bosses don't bear against the upper inner edges of the openings in which they are engaged at the moment where the big end of the rod rests against the concave extension of the actuating lever. The small working clearance protects the bosses against shearing fatigue.

The connection rod can be obtained either by one-piece molding together with the piston, or by being assembled to the piston by any appropriate connector.

BRIEF DESCRIPTION OF THE DRAWINGS

The drawings annexed as an example will provide for a better understanding of the invention, of its characteristics and advantages.

DESCRIPTION OF THE PREFERRED EMBODIMENT

Figure 1:
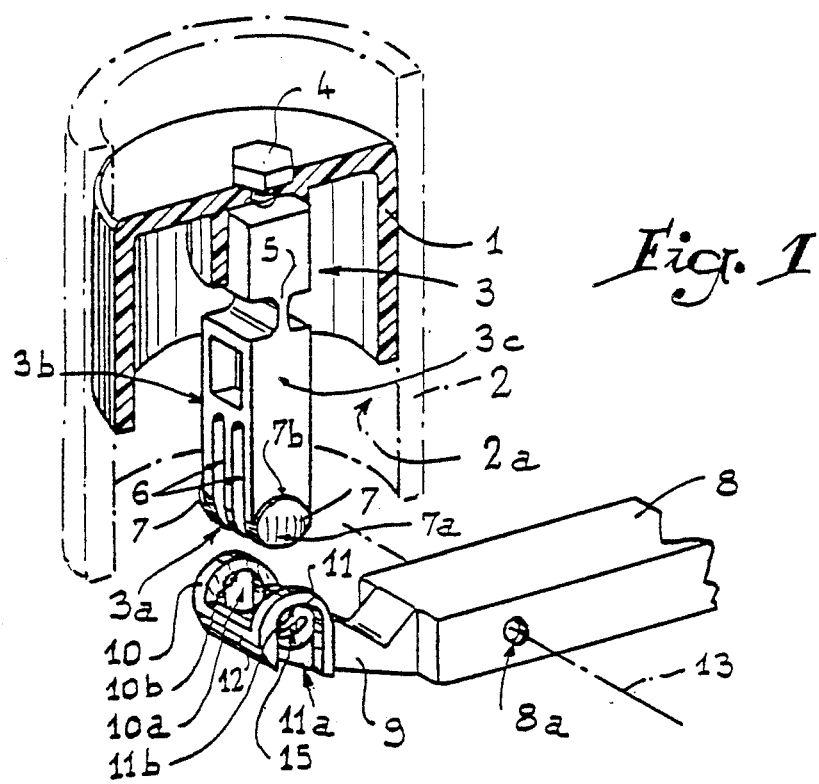
FIG. 1 is a perspective view showing the different elements of a connecting rod assembly according to the invention.

FIG. 1 shows a piston 1 intended to move inside the bore 2a of a cylinder 2 represented by dash-and-dot lines. The piston 1 is assembled to one of the ends of the connecting rod 3 by the screw 4.

The foot of the connecting rod 3, i.e. the end of the rod that is attached to the piston, presents beneath the assembling area a thinner section 5 forming a kind of articulation that enables the rod foot to change its orientation with respect to the rod shank and to convey an axial driving force without buckling. The connecting rod is of course made of a material having a certain elasticity, such as a plastic material. The piston 1 and the connecting rod 3 may also be manufactured in one piece.

The shank of the connecting rod 3 presents two longitudinal cutouts 6 starting from the big end of the rod and making it possible to reduce elastically the thickness of the shank by squeezing closer to each other the different blades separating the cutouts. The lower part or bearing end of the rod 3 has a round shape 3a and its two opposite side faces 3b, 3c are provided each with a boss 7 protruding perpendicularly to each face.

The connecting rod 3 is intended to co-operate with an actuating lever 8 the end of which is in the form of a lug 9 ending in two arch-shaped flanges 10, 11, connected together by a concave plate 12 facing upwards and having a round shape matching that of the lower end 3a of the rod 3. It is to be noted that each of the flanges 10, 11 has an opening 10a, 11a running through them except in the area of the plate 12.

The lever 8 is provided with a bore 8a through which a pin 13 is engaged, that interacts with a fixed part 14 integral with the cylinder 2 in order to ensure the swinging of the lever 8.

To assemble the lever 8 and the connecting rod 3, it is sufficient to compress the lower end of the latter in order to reduce the width of the cutouts 6 so that the rod can be inserted between the flanges 10 and 11 of the lever 8, by pressing the bosses 7 inwards. Thereafter, by lowering the rod deeper between the flanges, it is possible to bring said bosses 7 level with the openings 10a and 11a. On releasing the connecting rod, the bosses become resiliently engaged in the openings, which completes the assembling. As can be seen on FIG. 2, the lower end 3a of the rod comes to rest against the upper face 12a of the plate 12, while the bosses 7 lie at a very small distance d from the upper inner edges 10b, 11b of the openings 10a, 11a of the flanges 10, 11. It can be seen that the plate 12 presents through-passages 15 intended for the evacuation of any foreign bodies that might lie between the plate and the end 3a of the rod 3.

It is to be noted that the outer face of each boss 7 is provided with a round chamfer 7a that slopes toward the lower part of the rod but doesn't concern the upper area 7b of each boss, which is intended to come in contact with the upper inner edges 10b, 11b of the openings 10a, 11a in the flanges 10, 11 of the lug 9.

This arrangement provides for an automatic coupling of the lug to the connecting rod once the cylinder is in place. By moving the lever so as to raise the lug 9, the stationary rod penetrates between the flanges 10, 11, whose upper part is slightly flaring as can be seen on FIGS. 2 and 3. This insertion causes the rod to shrink and the bosses to deflect inwards until they come level with the openings 10a, 11a. At that moment, they are no longer pushed aside by the flanges and the elasticity of the connecting rod makes them penetrate in said openings.

It goes without saying that disconnecting the rod is achieved by proceeding in the reversed manner, i.e. by squeezing the bosses 7 between thumb and forefinger, in order to compress the big end of the rod, and by lowering the lug 9 to disengage said bosses from the flanges.

Figures 2, 3:
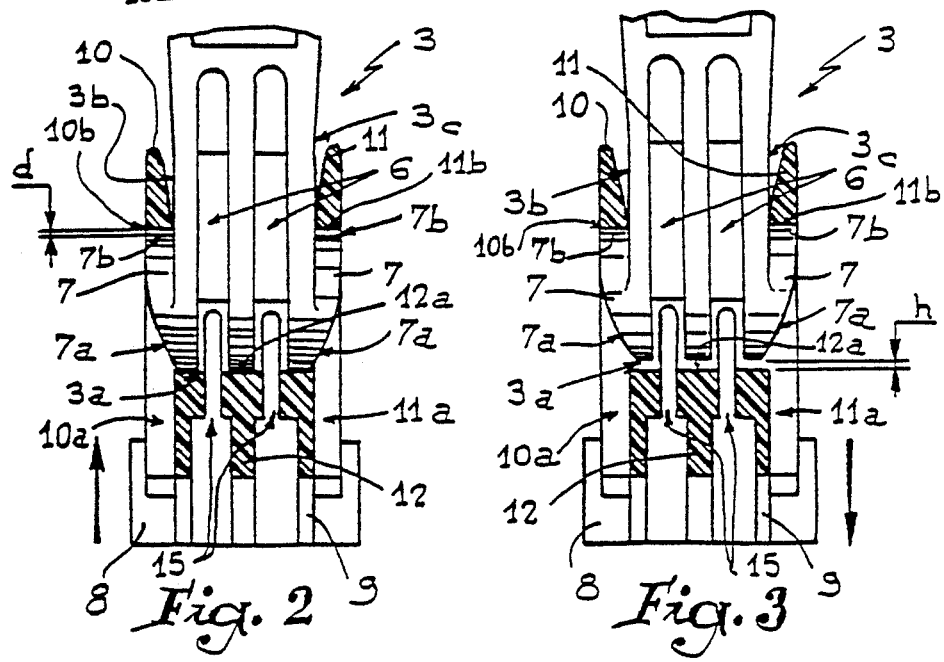
FIGS. 2 and 3 are vertical cross-section views showing the manner in which the big end of the rod co-operates with the actuating lever respectively during the driving stroke of the rod and during its return travel.

FIG. 3 shows the connecting rod during its return travel. At that moment, the bosses 7 bear against the upper inner edges 10b and 11b while the lower end 3a of the connecting rod lies at a certain height h above the upper face 12a of the plate 12.

Figure 4:
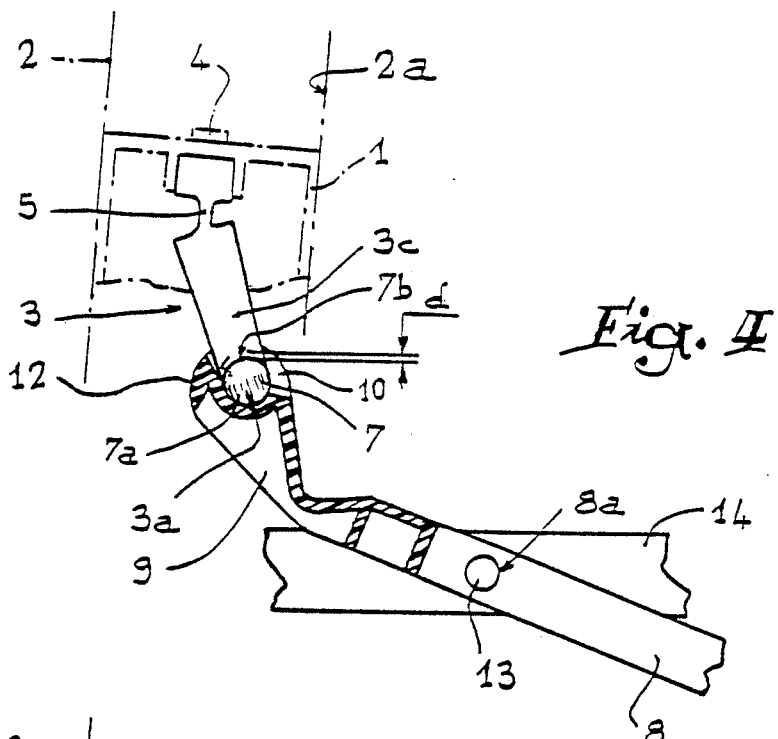
FIGS. 4 and 5 are side views representing the connecting rod assembly according to the invention during the driving stroke of the piston (arrow F1) and its return travel (arrow F2) for positions of the piston close to its top and bottom dead centers.
Figure 5:
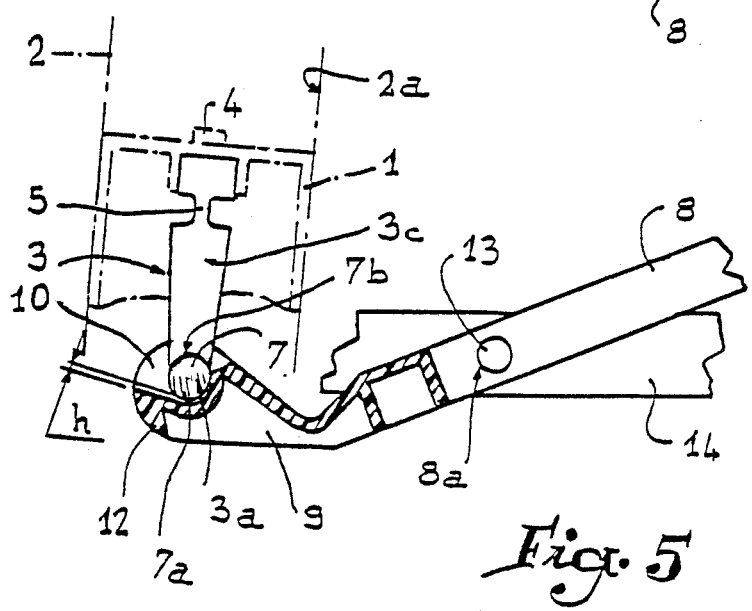

These two positions are also clearly shown on FIGS. 4 and 5, where the change in the geometry of the rod can be seen. On FIG. 4 the area 5 is deformed, i.e. the rod shank stands obliquely with respect to the small end of the rod, contrarily to FIG. 5, where the rod is not deformed, and perfectly straight.

It is to be understood that the foregoing description is given only as an example and that it doesn't restrict in any way the scope of the invention, which would still apply in case realization details were to be modified or replaced by any other equivalent ones.

What is claimed is:

1. A connecting rod assembly for reciprocating a piston within a cylinder comprising, a connecting rod having upper and lower ends which are integrally formed with respect to one another along an elongated axis, said connecting rod having an area of reduced dimension spaced from said upper end thereof, said area of reduced dimension being yieldable so as to permit said lower end of said connecting rod to be positioned in various orientations with respect to said upper end, said lower end of said connecting rod including a plurality of blade elements which are spaced relative to one another and which extend generally parallel to said elongated axis of the connecting rod, each of said blade elements having a curved lower bearing surface portion, said blade elements being yieldably resilient so as to be urged toward one another and thereafter being capable of assuming their original configuration, an actuating lever, said actuating lever having an end portion, and means for cooperatively seating said curved lower bearing surface portions of said blade elements of said connecting rod with said end portion of said lever, and connector means carried by said blade elements for cooperatively engaging said end portion of said actuating lever.

2. The reciprocating piston assembly of claim 1 in which said end portion of said actuating lever includes a concave bearing surface which is in opposing relationship with said curved lower bearing surface portions of said blade elements, a pair of flange members disposed on either side of said concave bearing surface of said end portion of said actuating lever, said flange members defining a pair of opposed openings spaced above said concave bearing surface, said connector means including a pair of boss elements which are yieldably receivable within said openings.

3. The connecting rod of claim 2 in which said boss elements include tapered lower portions, said tapered lower portions being engageable with said flange members of said end portion of said lever as said lower end portion of said connecting rod is inserted within said end portion of said actuating lever, said openings being defined by upper edge portions and of a size which is slightly greater in dimension than said boss elements whereby a space is created between said boss elements and said upper edge portions of said openings when said boss elements are seated within said openings and whereby the outermost blade elements are resiliently urged inwardly with respect to one another as said lower end of said reciprocating rod passes said flange members and thereafter said boss members are locked within said openings as said blade elements resiliently return to their original configuration.

4. The connecting rod assembly of claim 3 including through passages formed in said concave bearing surface of said end of said actuating lever, said through passages providing space for evacuating material from between said lower end of said connecting rod and the concave bearing surface of said end portion of said actuating lever.

5. A combination piston and connecting rod assembly for reciprocating the piston within a cylinder comprising, a piston means, a connecting rod having upper and lower ends which are integrally formed with respect to one another, means for securing said upper end of said connecting rod in fixed relationship with respect to said piston means, said connecting rod having an area of reduced dimension spaced from said upper end thereof, said area of reduced dimension being yieldable so as to permit said lower end of said connecting rod to be positioned in various orientations with respect to said upper end, an actuating lever, said actuating lever having an end portion, said lower end of said connecting rod including a plurality of blade means which are spaced and generally parallel relative to one another, said blade elements being yieldably resilient so as to be urged toward one another and thereafter being capable of assuming their original configuration, and connector means carried by at least two of said blade elements for cooperatively engaging said end portion of said actuating lever.

6. The reciprocating piston assembly of claim 5 in which said end portion of said actuating lever includes a concave bearing surface which is in opposing relationship with said curved bearing surface of said lower end of said connecting rod, a pair of flange members disposed on either side of said concave bearing surface of said end portion of said actuating lever, said flange members defining a pair of opposed openings spaced above said concave bearing surface, said connector means including a pair of boss elements which are yieldably receivable within said opening.

7. The connecting rod of claim 6 in which said boss elements include tapered lower portions, said tapered lower portions being engageable with said flange members of said end portion of said lever as said lower end portion of said connecting rod is inserted within said end portion of said actuating lever whereby the outermost blade elements are resiliently urged inwardly with respect to one another as said lower end of said reciprocating rod passes said flange members and thereafter said boss members are locked within said openings as said blade elements resiliently return to their original configuration.

8. The connecting rod assembly of claim 7 including through passages formed in said concave bearing surface of said end of said actuating lever, said through passages providing space for evacuating material from between said lower end of said connecting rod and the concave bearing surface of said end portion of said actuating lever.

* * * * *